United States Patent [19]

Bächle et al.

[11] Patent Number: 5,517,976
[45] Date of Patent: May 21, 1996

[54] DIESEL ENGINE EQUIPPED FOR REDUCING HARMFUL SUBSTANCES IN ITS OPERATION

[75] Inventors: Bernhard Bächle; Hans Sudmanns, both of Friedrichshafen; Ralph-Michael Schmidt, Langenargen, all of Germany

[73] Assignee: MTU Motoren- und Turbinen-Union Friedrichshafen GmbH, Friedrichshafen, Germany

[21] Appl. No.: 276,941

[22] Filed: Jul. 19, 1994

[30] Foreign Application Priority Data

Jul. 20, 1993 [DE] Germany .......................... 43 24 115.8
Sep. 16, 1993 [DE] Germany .......................... 43 31 509.7

[51] Int. Cl.⁶ ........................................ F02M 25/07
[52] U.S. Cl. .................................... 123/569; 123/570
[58] Field of Search ........................ 123/58.8, 568, 123/569, 570, 571; 60/605.2

[56] References Cited

U.S. PATENT DOCUMENTS

| | | | |
|---|---|---|---|
| 3,982,395 | 9/1976 | Hasegawa et al. | 60/278 |
| 4,056,933 | 11/1977 | Nohira et al. | 60/278 |
| 4,100,734 | 7/1978 | Ozaki et al. | 123/568 |
| 4,108,114 | 8/1978 | Kosaka et al. | 123/58.8 |
| 4,109,462 | 8/1978 | Kohama et al. | 123/568 |
| 4,131,095 | 12/1978 | Ouchi | 123/58.8 |
| 4,249,382 | 2/1981 | Evans et al. | 60/605.2 |
| 4,345,572 | 8/1982 | Suzuki et al. | 123/568 |
| 5,178,119 | 1/1993 | Gale | 123/568 |

FOREIGN PATENT DOCUMENTS

| | | |
|---|---|---|
| 2454829 | 11/1976 | Germany . |
| 3930243 | 3/1991 | Germany . |
| 2011535 | 7/1979 | United Kingdom . |
| 2043770 | 10/1980 | United Kingdom . |
| 2215241 | 9/1989 | United Kingdom . |

*Primary Examiner*—Willis R. Wolfe
*Attorney, Agent, or Firm*—W. G. Fasse; W. F. Fasse

[57] ABSTRACT

The production of harmful substances during the operation of multi-cylinder diesel engines is reduced by separating the cylinders of the engine into two groups in combination with an exhaust gas return from one group to the other. The first group includes a plurality of the cylinders (2 to 6). The second group includes at least one cylinder (7), which is separated from the first group as far as combustion is concerned. A first fresh air suction intake (9) supplies fresh air to the group of first cylinders (2 to 6). An exhaust gas return device (24) feeds either directly or indirectly exhaust gas from the at least one second cylinder (7) through the first fresh air suction intake (9) to the group of first cylinders (2 to 6). A second fresh air suction intake (10) supplies fresh air to the second group of cylinders (7). The second fresh air suction intake (10) may also receive some exhaust gas which is then combusted by an additional fuel supply in the second fresh air suction intake (10).

17 Claims, 4 Drawing Sheets

DIESEL ENGINE EQUIPPED FOR REDUCING HARMFUL SUBSTANCES IN ITS OPERATION

FIELD OF THE INVENTION

The invention relates to diesel engines equipped with an apparatus for reducing harmful substances in the exhaust gases of a multi-cylinder internal combustion diesel engine.

BACKGROUND INFORMATION

In connection with the operation of diesel engines, the primary harmful substances that are emitted with the exhaust gases are $NO_x$ compounds. Efforts have been made to reduce the $NO_x$ content. For this purpose cooled exhaust gas is returned or fed back from the exhaust of the diesel engine to its fresh air supply. It has been determined that a return of about 20% of the exhaust gas volume reduces the $NO_x$ value to about one half of the value it would have without the exhaust gas return. The reduction of the $NO_x$ value can be seen as the result of the increased $CO_2$ proportions in the combustion air where an exhaust gas return into the fresh air supply takes place. However, the just described exhaust gas return has the disadvantage that the soot content of the exhaust gas rises with an increase in the exhaust gas return into the fresh air supply. The result of the higher soot content on the other hand leads to an increased wear and tear of the diesel engine. Yet another disadvantage is seen in that the exhaust gas cooler is contaminated already after a short operational period.

German Patent Publication (DE-AS) 24 54 829 discloses a multicylinder internal combustion engine in which one cylinder which is intended for receiving exhaust gas, has a higher compression ratio than the other cylinders of the engine. The cylinder with the higher compression ratio is connected with its exhaust port to the inlet ports of the other cylinders. The higher compression ratio cylinder provides a drive power only during the starting of the internal combustion engine. During starting, a closure valve is closed in an exhaust pipe so that the cylinder with the higher compression ratio takes up the exhaust gases from the other cylinders and ignites these exhaust gases. During normal operation of the internal combustion engine the cylinder with the higher compression ratio takes up a portion of the exhaust gases of the other cylinders, thereby dosing that portion and cooling it. This prior art device for an exhaust gas return is structurally involved and hence its manufacture is expensive.

German Patent Publication (DE-OS) 39 30 243 discloses a multicylinder internal combustion engine with a fresh air suction intake and with a collection system for the exhaust gases, including an exhaust gas return device for the reduction of harmful substances in the exhaust. In order to operate the internal combustion engine of the just mentioned German Patent publication with an exhaust gas turbo-charger and with a fresh air cooler, the exhaust gas return device comprises an exhaust gas distributor. This exhaust gas distributor has branching end pipes, the number of which corresponds to the number of the cylinders in the internal combustion engine. The exhaust gas distributor is connected to the exhaust gas pipe of one cylinder while the exhaust gas pipes of the other cylinders are connected to an exhaust gas collector pipe. The end pipes of the exhaust gas distributor lead into the cylinder suction intake pipes directly or immediately upstream of the inlet valve of the respective cylinder. The problem of an increased soot concentration has not been solved by the just mentioned apparatus. The increased soot concentration in the returned exhaust gas and the above mentioned disadvantages caused thereby for the internal combustion engine and the emission of more soot still poses a problem that leaves room for improvement.

OBJECTS OF THE INVENTION

In view of the above it is the aim of the invention to achieve the following objects singly or in combination:

- to provide a multi-cylinder diesel engine with such devices that the harmful substances produced during the operation of the diesel engine are reduced;
- the above object is to be achieved with a small structural effort and expense yet assuring a small $NO_x$ content and a small soot content in the eventually emitted exhaust gas of the diesel engine;
- to keep the soot content in the returned exhaust gas constantly so small that wear and tear on the diesel engine and the contamination of the coolers by the returned exhaust gas is tolerably small; and
- to avoid returning in a diesel engine exhaust gas through the fresh air cooler to thereby avoid exposing the fresh air cooler to compressed fresh air and hot gases simultaneously.

SUMMARY OF THE INVENTION

According to the invention the above objects have been achieved by dividing the number of cylinders in a diesel engine into two groups, whereby each group has its own fresh air suction intake and an exhaust gas return device returns exhaust gas from the second group of cylinders containing at least one cylinder to a fresh air supply for all cylinders of the engine or only to cylinders of the first group of cylinders.

In the embodiments in which exhaust gas from the at least one second cylinder is returned only to the fresh air suction intake of the first group of cylinders, the second cylinder or cylinders are supplied only with fresh air to achieve a minimal particle emission without regard to the NO emission from the second cylinder or cylinders. In this embodiment, exhaust gas from the second cylinder or cylinders is supplied through the exhaust gas return device to the common fresh air suction intake of all the cylinders in the first group which are constructed for low NO emission.

In the other embodiment of the invention wherein exhaust gas from the second cylinder or cylinders is supplied to the fresh air suction intakes of the first and second cylinders, preferably through a cooler, the suction intake of the second cylinder or cylinders is provided with additional fuel for combusting the exhaust gases that have been admixed to the fresh air of the second fresh air suction intake.

A multi-cylinder diesel engine equipped according to the invention emits only a small amount of NO and the soot components or proportions in the returned exhaust gas are constantly held to such a low value that the wear and tear on the components of the diesel engine and the contamination of any coolers in the system by returned exhaust gas is also held small.

A soot filter is preferably inserted in the exhaust gas return device in order to further reduce the contamination and respective wear and tear on internal combustion engines equipped as taught herein.

According to a further advantageous embodiment of the invention a fresh air cooler is arranged downstream of a fresh air compressor or charger in the fresh air supply conduit, whereby the fresh air cooler is preferably arranged in the fresh air suction intake of the group of first cylinders and the same cooler can be used for cooling returned or fed back exhaust gas from the second cylinder or cylinders.

According to a further preferred embodiment of the present apparatus, the exhaust gas return flow is also equipped with an exhaust gas cooler, whereby the returned and cooled exhaust gas is supplied into the fresh air intake of the first group of cylinders downstream of the fresh air cooler or charger air cooler. The fresh air or charger air cooler thus remains free of any soot that may still be present in the exhaust gas that is being returned and the thermal loading of the fresh air cooler simultaneously with compressed fresh air and hot exhaust gases is avoided, because two spatially separated coolers are used and the respective loads are distributed onto these coolers.

The fresh air supply according to the invention, preferably comprises a fresh air charger or compressor and a charger air or fresh air cooler, whereby the latter is preferably a two-stage cooler having a first stage made of stainless steel and a second stage made of aluminum. The first stainless steel stage is especially resistant against high temperatures and the second aluminum stage has especially advantageous heat transfer characteristics.

It is possible to establish an especially advantageous ratio of reduced soot proportions to reduced NO proportions in the exhaust gas of the apparatus according to the invention, if a connector conduit preferably with an adjustable cross-sectional flow area is arranged between the exhaust gas discharge system of the group of first cylinders and the exhaust gas return device of the second cylinder or cylinders. A variable flow area valve is preferably arranged in this connection conduit. In order to achieve a soot proportion as small as possible in the returned exhaust gas, the connector conduit may be opened widely for a large cross-sectional flow area. The cross-sectional flow area of the connector conduit is narrowed or entirely closed for achieving $NO_x$ proportions as small as possible.

An especially advantageous reduction in the soot proportions in the exhaust gas may be achieved according to the invention, by increasing the pressure difference between a higher compressor pressure and a lower exhaust gas counter pressure in the exhaust gas return device that feeds back a proportion of exhaust gas from the second cylinder or cylinders to the fresh air supply, preferably to the first fresh air suction intake of the first cylinders. In order to increase the compressor imposed pressure of the fresh air upstream of the second cylinder or cylinders and thus increasing the constant exhaust gas counter pressure in the exhaust gas return device, the invention suggests arranging a choke or flow restrictor in the first fresh air suction intake leading to the group of first cylinders constructed for an optimal $NO_x$.

According to another embodiment of the invention, the reduction of the soot proportions in the exhaust gas can also be achieved with an increased pressure difference between the fresh air pressure and the exhaust gas counter pressure by connecting the exhaust gas return device to the fresh air suction intake of the group of first cylinders through an injector.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
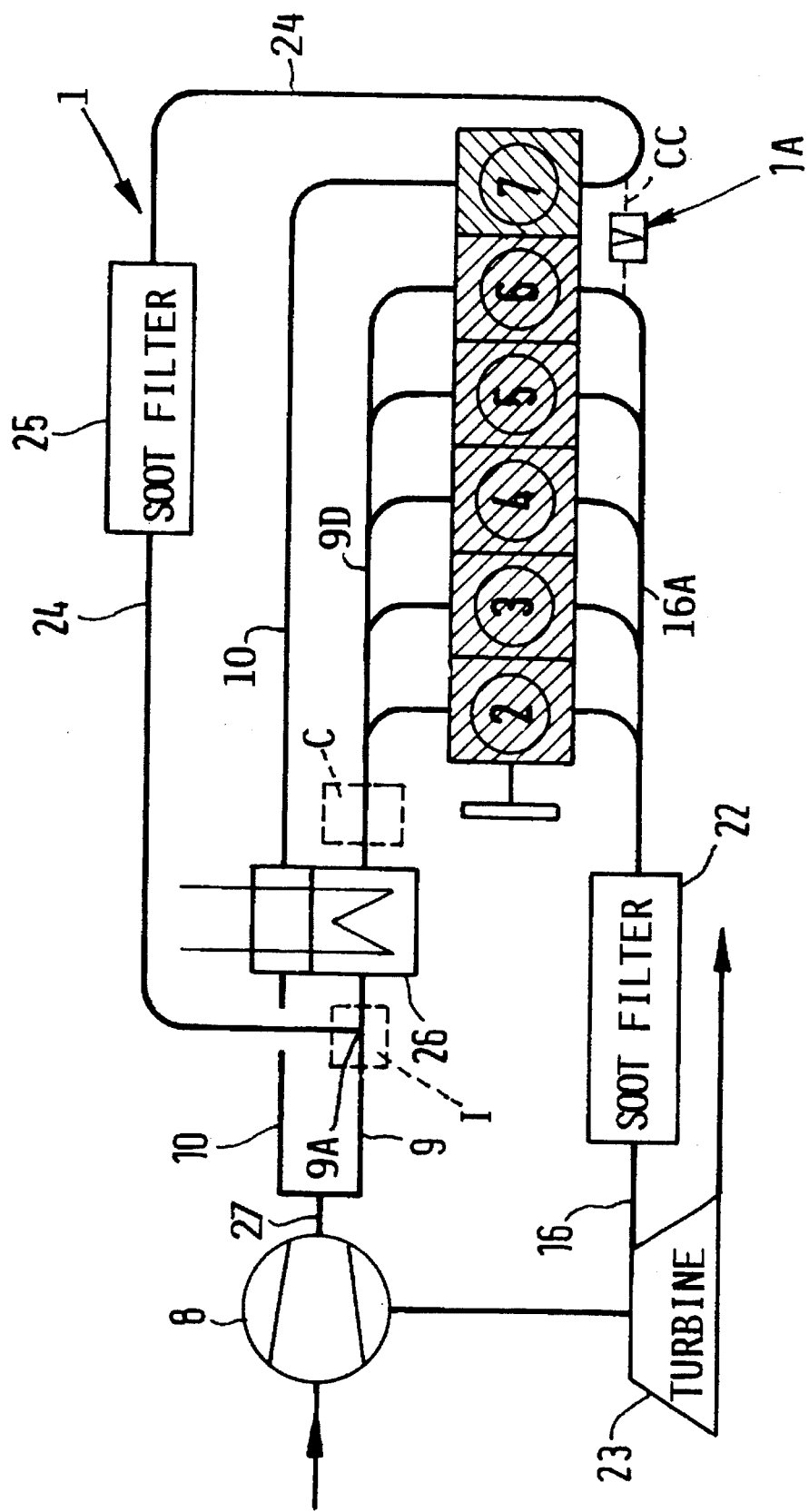
FIG. 1 is a schematic illustration of a diesel engine with an exhaust gas return according to the invention including a fresh air cooler or charger air cooler.

In FIG. 1 a diesel engine 1 comprises a group of first cylinders 2 to 6 and another group of second cylinders including at least one second cylinder 7. A fresh air compressor 8 charges compressed fresh air through a fresh air inlet conduit 27 into a first suction fresh air intake 9 connected through a manifold 9D to the fresh air inlet ports of all the first cylinders 2 to 6. The fresh air inlet conduit 27 also charges fresh air into a second fresh air suction intake 10 connected to the fresh air inlet port of the second cylinder 7. An exhaust gas system 16 is connected through a manifold 16A to the exhaust gas ports of the first cylinders 2 to 6. The exhaust gas discharge system 16 includes a soot filter 22 through which the exhaust gases pass into a turbine 23 driven by the exhaust gases. The turbine 23 drives the compressor 8.

According to the invention, the exhaust gas port of the second cylinder 7 is connected through an exhaust gas return device 24 such as a return pipe, channel, or duct to a port 9A of the first fresh air suction intake pipe 9. As shown in FIG. 1, the port 9A is positioned upstream of a charger air or fresh air cooler 26 that functions as a heat exchanger and cools the fresh air supply for both intake pipes 9 and 10. Preferably, the fresh air cooler 26 is constructed with two stages with a first stage made of stainless steel for the higher temperatures and a second stage made of aluminum for an excellent heat exchange.

A further soot filter 25 is connected in the exhaust gas return device 24 for removing soot from the returned exhaust gas flow that is passed into the fresh air suction intake pipe 9. Since port 9A is positioned upstream of the cooler 26, the filter 25 protects the cooler 26 against soot contamination.

According to a preferred embodiment, a connector conduit CC connects the exhaust system 16 to the return device 24, preferably through a control valve 1A for controlling the cross-sectional flow area in the connector conduit CC. This feature makes it possible to adjust the proportion of reduced soot to the proportion of reduced NO in the device 24.

According to another embodiment of the invention a choke C is provided in the first suction fresh air intake pipe 9 for controlling the pressure difference between the higher compressor pressure and the lower exhaust gas counter pressure.

In another preferred embodiment, the portion of the exhaust gas return device 24 connected to the port 9A is provided with an injector I to reduce soot particles in the return gas by an increased pressure difference between the compressor pressure in the fresh air suction intake pipe 9 and the return device 24.

Figure 2:
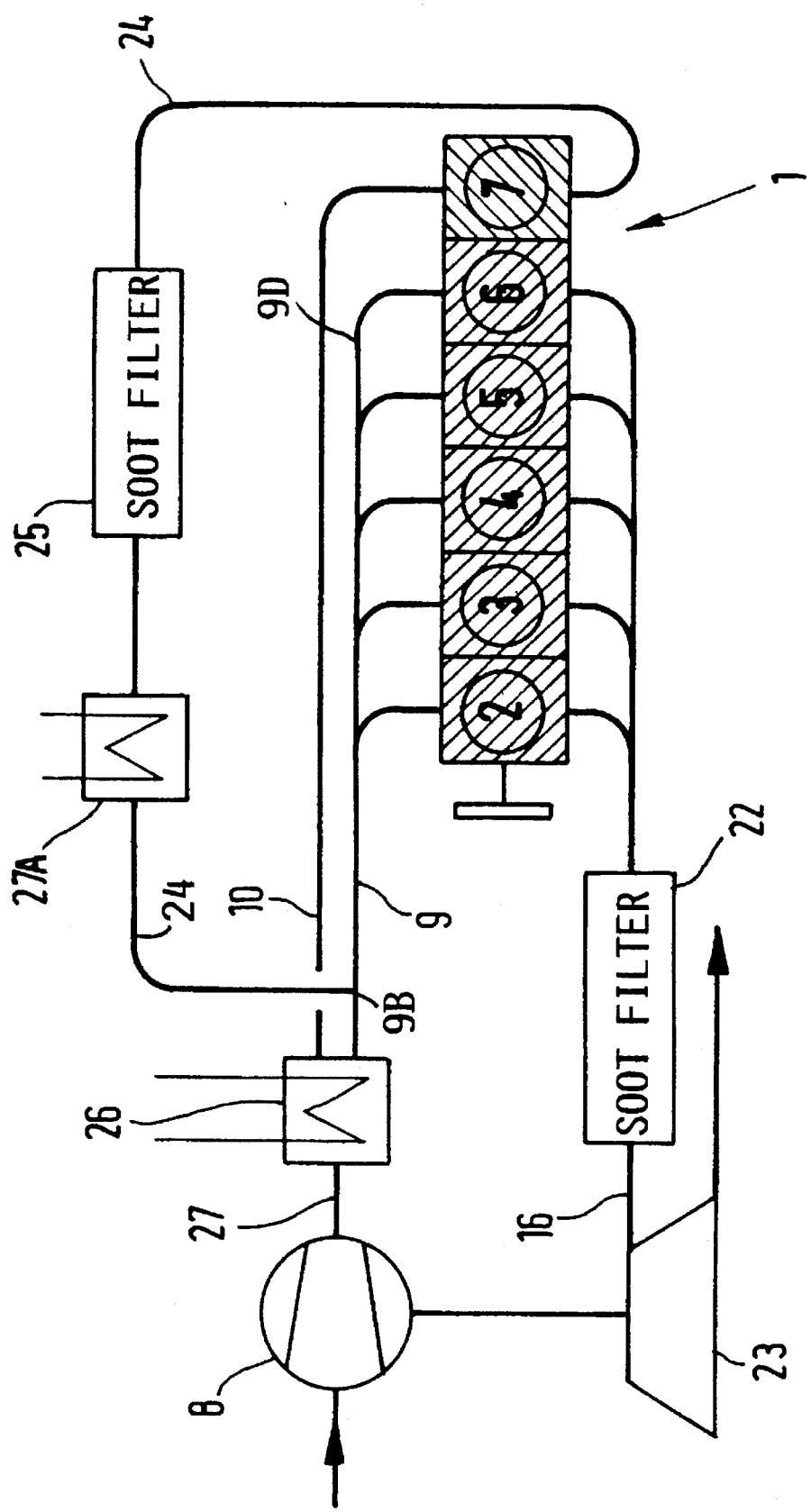
FIG. 2 is a schematic view similar to that of FIG. 1, also showing a diesel engine with an exhaust gas return including a fresh air or charger air cooler and a separate return gas flow cooler.
Figure 3:
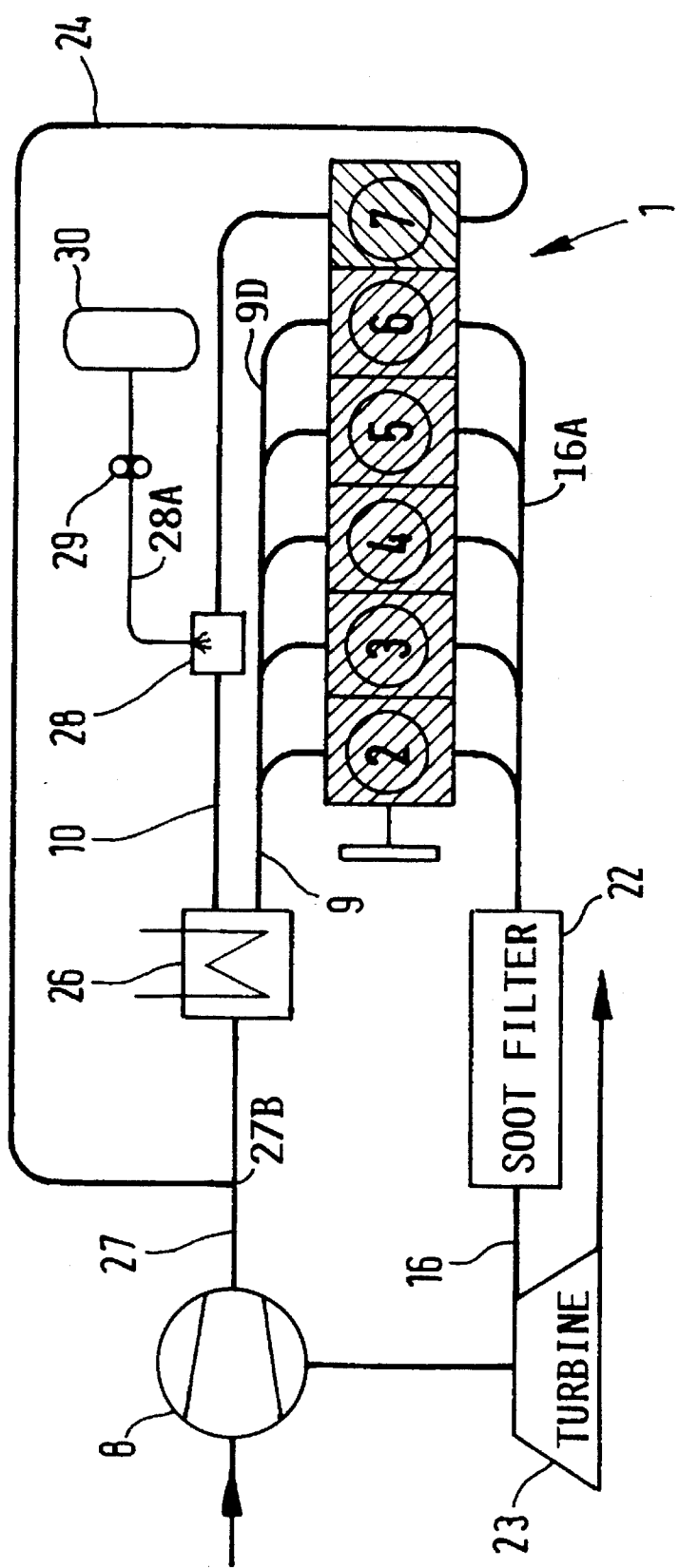
FIG. 3 is a schematic illustration of an internal combustion engine with an exhaust return device including a fresh air or charger air cooler and constructed for the use of diesel or gas fuel or for gasoline fuel operation.
Figure 4:
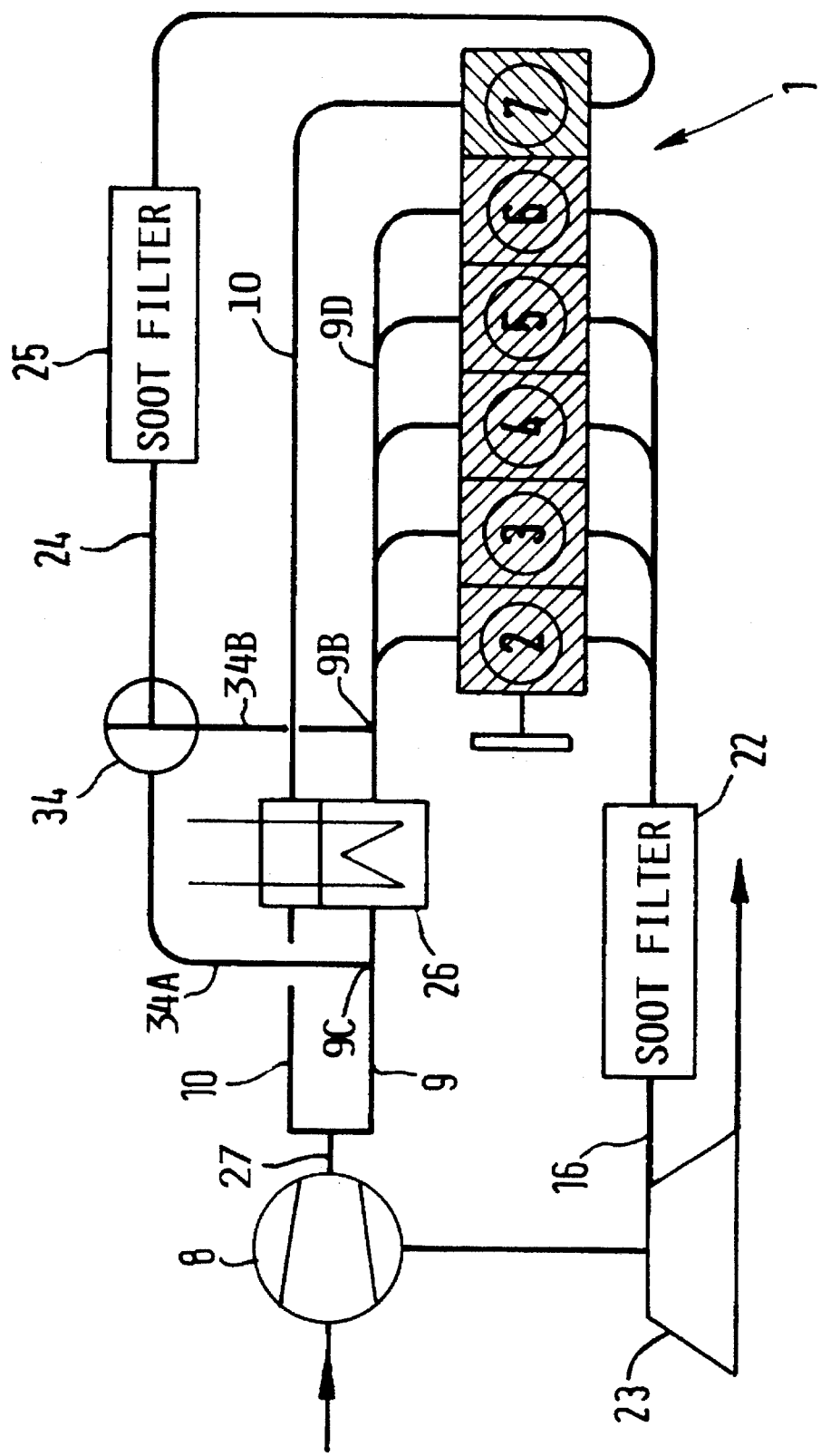
FIG. 4 is a schematic illustration of a diesel engine similar to that of FIG. 1 with a by-pass valve in the exhaust gas return device for passing returned exhaust gas flow either through the fresh air or charger air cooler or not passing the return gas flow through the cooler.

Components in FIGS. 2, 3 and 4 that perform the same function as the same components in FIG. 1, are provided with the same reference numbers.

FIG. 2 illustrates in a diesel engine the use of a cooler 27A in addition to the charger air or fresh air cooler 26. The additional cooler 27A is provided in the exhaust gas return device 24, whereby it is no longer necessary to pass the exhaust gas return flow through the fresh air cooler 26. Therefore, the port 9B, where the return device 24 is connected to the first fresh air suction intake 9, is positioned downstream of the fresh air cooler 26 rather than upstream thereof, as shown in FIG. 1. Both suction air intakes 9 and 10 are connected to respective outlet ports of the cooler 26, the inlet port of which is connected through the above mentioned fresh air inlet conduit 27 to the fresh air compressor 8. The soot filter 25 and the additional cooler 27A are connected in series in the return device 24, whereby the soot filter 25 is positioned upstream of the additional cooler 27A as viewed in the flow direction of the exhaust gas from the second cylinder 7 to the port 9B in the suction pipe or intake 9.

FIG. 3 shows an embodiment of a diesel engine, in which the return flow device 24 leads directly from the exhaust gas discharge port of the second cylinder 7 to a connector port 27B in the fresh air inlet duct 27 without any soot filter nor any further cooler in the return device 24. The connector port 27B is positioned upstream of the cooler 26 as viewed in the flow direction of the fresh air from the charger or compressor 8 to the cooler 26. Additional combustion fuel from a tank 30 is introduced into the second fresh air suction intake 10. For this purpose, a carburetor or fuel injection device 28 is connected through a fuel pipe line 28A to the tank 30 and the fuel is transported by a pump 29. As mentioned, the embodiment of FIG. 3 avoids a soot filter in the return device 24.

The above mentioned connector conduit CC shown in FIG. 1 may also be used in FIGS. 2 and 3 to interconnect the exhaust gas system 16 of the group of first cylinders 2 to 6 with the exhaust gas return device 24. In all these instances, the connector conduit CC is preferably provided with a device for adjusting the cross-sectional flow area in order to control the rate of return of exhaust gas from the second cylinder 7 in the exhaust gas return device 24.

Further, the pressure difference between the pressure upstream of the second cylinder 7 and the exhaust gas counter pressure should be as large as possible. For this purpose, the invention provides the above mentioned choke C in the first fresh air suction pipe 9 of the first cylinders 2 to 6. However, the same effect can be achieved by the above mentioned injector I shown in FIG. 1 in dashed lines.

The embodiment of FIG. 4 is substantially a combination of FIGS. 1 and 2 because a two-way valve 34 permits a selective connection of the return device 24 either through the pipe 34A to a point 9C upstream of the cooler 26 or through the pipe 34B to a point 9B downstream of the cooler 26. Thus, the cooler 26 may be selectively by-passed to achieve the advantages described above, especially when the engine is not driving a full load.

Referring again to FIG. 3, showing an alternative diesel of the invention, in which the second cylinder 7 is operated with gas or gasoline as fuel, whereby the combustion of these fuels in the cylinder 7 produces a soot-free exhaust gas, which is supplied to the connecter port 27B upstream of the cooler 26, so that the returned exhaust gas from the cylinder 7 passes through the cooler 26 into both air intakes 9 and 10. The result of this type of operation, as shown in FIG. 3, is an NO emission, which is uniformly low from all cylinders 2 to 7.

In the operation of all embodiments, fresh air is supplied under increased pressure to the cylinders from the compressor 8, whereby the latter is driven by the turbine 23, as mentioned. The turbine in turn receives its gas flow from the exhaust system 16 connected to the first group of cylinders 2 to 6. In the embodiments of FIGS. 1, 2 and 4, the cylinder 7 receives exclusively fresh air through the intake pipe 10. However, in the embodiment of FIG. 3, the cylinder 7 also receives a mixture of return exhaust gas, fresh air and extra fuel as described.

A soot filter 25 is required in the embodiments of FIGS. 1, 2 and 4. However, such a soot filter 25 is obviated in the embodiment of FIG. 3 because the soot proportion in the exhaust gas from the second cylinder 7 is relatively low, due to the fact, that exclusively fresh air is supplied to the second cylinder 7 so that the soot proportion does not exceed a low value, while the NO proportions in the exhaust gas of the first cylinders 2 to 6 are kept low, due to the return of exhaust gases. The invention further provides the possibility to optimally reduce the $NO_x$ proportion and the soot proportion by various combustion adjustments, such as providing different compression ratios, different fuel injections, and differently shaped piston heads and so forth.

Although the invention has been described with reference to specific example embodiments, it will be appreciated that it is intended to cover all modifications and equivalents within the scope of the appended claims.

What is claimed is:

1. A multi-cylinder diesel engine, comprising a fresh air supply (8), a group of first cylinders (2 to 6), and at least one second cylinder (7), a first fresh air suction intake (9) connected to said fresh air supply and to said group of first cylinders (2 to 6), a second fresh air suction intake (10) connected to said fresh air supply and to said at least one second cylinder (7), an exhaust gas system (16) connected to exhaust ports of said group of first cylinders (2 to 6), and an exhaust gas return device (24) connected to an exhaust port of said at least one second cylinder (7), said exhaust gas return device (24) being further connected to said fresh air supply for returning exhaust gas from said at least one second cylinder (7) to said fresh air supply (8, 27), said diesel engine further comprising a connector conduit (CC) interconnecting said exhaust gas system (16) and said exhaust gas return device (24), and a flow control member (1A) in said connector conduit (CC) for adjusting the flow cross-sectional area of said connector conduit (CC).

2. A multi-cylinder diesel engine, comprising a fresh air supply (8), a group of first cylinders (2 to 6), and at least one second cylinder (7), a first fresh air suction intake (9) connected to said fresh air supply and to said group of first cylinders (2 to 6), a second fresh air suction intake (10) connected to said fresh air supply and to said at least one second cylinder (7), an exhaust gas system (16) connected to exhaust ports of said group of first cylinders (2 to 6), and an exhaust gas return device (24) connected to an exhaust port of said at least one second cylinder (7), said exhaust gas return device (24) being further connected to said fresh air supply for returning exhaust gas from said at least one second cylinder (7) to said fresh air supply (8, 27), said diesel engine further comprising an injector (I) connected to said exhaust gas return device (24) where said exhaust gas return device (24) is connected to said first fresh air suction intake (9).

3. A multi-cylinder diesel engine, comprising a fresh air supply (8), a group of first cylinders (2 to 6), and at least one second cylinder (7), a first fresh air suction intake (9) connected to said fresh air supply and to said group of first cylinders (2 to 6), a second fresh air suction intake (10) connected independently of said first fresh air suction intake (9) to said fresh air supply and to said at least one second cylinder (7) for producing an exhaust gas flow having a reduced soot content from said at least one second cylinder (7), an exhaust gas system (16) connected to exhaust ports of said group of first cylinders (2 to 6), and an exhaust gas return device (24) connected to an exhaust port of said at least one second cylinder (7), said exhaust gas return device (24) being further connected to said fresh air supply for returning said reduced soot content exhaust gas flow from said at least one second cylinder (7) to said fresh air supply, said reduced soot content being constantly sufficiently low so that wear and tear and contamination of said diesel engine are reduced and particle and NO emission are minimized.

4. The diesel engine of claim 3, further comprising a soot filter (25) operatively interposed in said exhaust gas return device (24), and wherein said exhaust gas return device is connected to said first fresh air suction intake (9).

5. The diesel engine of claim 3, further comprising a fresh air cooler (26) for cooling fresh air, said exhaust gas return device (24) being connected at one end to said fresh air first suction intake (9) downstream of said fresh air cooler (26) and at its other end to said exhaust port of said at least one second cylinder (7), said exhaust gas return device (24) further comprising an exhaust gas return flow cooler (27A) and a soot filter (25) connected in series with each other in said exhaust gas return device (24).

6. The diesel engine of claim 3, further comprising a cooler (26) for cooling fresh air in said first fresh air suction intake (9), said fresh air cooler (26) comprising an upstream cooler section made of stainless steel and a downstream cooler section made of aluminum.

7. The diesel engine of claim 3, further comprising a choke (C) operatively connected in said first fresh air suction intake for controlling a pressure difference between a pressure in said fresh air suction intake and a pressure in such exhaust gas return device.

8. The diesel engine of claim 3, further comprising an injector (I) connected to said exhaust gas return device (24) where said exhaust gas return device (24) is connected to said first fresh air suction intake (9).

9. The diesel engine of claim 3, further comprising an exhaust gas turbine (23) connected to said exhaust gas system (16) for supplying exhaust gas as fuel to said exhaust gas turbine (23), said fresh air supply comprising a fresh air charger (8) driven by said turbine (23).

10. The diesel engine of claim 3, further comprising a fresh air cooler (26) for cooling fresh air from said fresh air supply (8), said exhaust gas return device (24) being connected at one end of said first fresh air suction intake (9) upstream of said air cooler (26) and at its other end to said exhaust port of said at least one second cylinder (7).

11. The diesel engine of claim 10, further comprising a two-position by-pass valve (34) connected in said exhaust gas return device (24) for selectively bypassing said fresh air cooler (26), whereby said exhaust gas return device (24) can be connected to one of an inlet port and an outlet port of said fresh air cooler (26).

12. The diesel engine of claim 3, further comprising a connector conduit (CC) interconnecting said exhaust gas system (16) and said exhaust gas return device (24).

13. The diesel engine of claim 12, further comprising a flow control member (1A) in said connector conduit (CC) for adjusting the flow cross-sectional area of said connector conduit (CC).

14. The diesel engine of claim 3, further comprising a fresh air conduit (27) connecting said fresh air supply (8) to said first and second fresh air suction intakes (9 and 10) leading to said group of first cylinders (2 to 6) and to said at least one second cylinder (7) respectively, said exhaust gas return device (24) connecting said exhaust port of said at least one second cylinder (7) to said fresh air conduit (27), said diesel engine further comprising a fuel tank (30), a fuel supply device (28, 28A, 29) operatively interposed between said fuel tank (30) and said second fresh air suction intake (10) for supplying fuel into said second fresh air suction intake (10).

15. The diesel engine of claim 14, further comprising a fresh air cooler (26), said fresh air conduit (27) connecting an inlet port of said fresh air cooler (26) to said fresh air supply (8) for cooling fresh air, said fresh air cooler (26) having a first outlet port connected to said first fresh air suction intake (9) leading to said group of first cylinders (2 to 6), said fresh air cooler (26) having a second outlet port connected to said second fresh air suction intake (10) leading to said at least one second cylinder (7).

16. The diesel engine of claim 14, wherein said fuel supply device comprises one of a carburetor and a fuel injector (28), a fuel line (28A) connecting said fuel supply device to said fuel tank (30) and a fuel pump (29) in said fuel line for pumping fuel from said fuel tank to said carburetor or fuel injector (28).

17. The diesel engine of claim 14, wherein a portion of exhaust gas from said at least one second cylinder (7) is supplied to said second fresh air suction intake (10) for combustion by fuel supplied by said fuel supply device (28, 28A, 29).

* * * * *